United States Patent [19]

Merklinger et al.

[11] Patent Number: 5,601,240

[45] Date of Patent: *Feb. 11, 1997

[54] MOBILE TIRE SHREDDER

[75] Inventors: Paul Merklinger, Windsor, Canada; Bruce Brewer, Farmers Branch, Tex.

[73] Assignee: Royal Recovery Systems, Inc., Windsor, Canada

[*] Notice: The term of this patent shall not extend beyond the expiration date of Pat. No. 5,395,061.

[21] Appl. No.: 425,842

[22] Filed: Apr. 20, 1995

Related U.S. Application Data

[63] Continuation-in-part of Ser. No. 398,137, Mar. 3, 1995.

[51] Int. Cl.[6] .................................................. B02C 21/02
[52] U.S. Cl. ......................... 241/101.74; 241/186.35; 241/DIG. 31; 241/DIG. 38
[58] Field of Search .................... 241/101.71, 101.74, 241/DIG. 31, DIG. 38, 186.35

[56] References Cited

U.S. PATENT DOCUMENTS

| | | | |
|---|---|---|---|
| 2,853,240 | 9/1958 | Mahoney, Jr. | 241/101.741 X |
| 3,913,850 | 10/1975 | Daniel | 241/101.74 |
| 3,997,121 | 12/1976 | Motek | 241/78 |
| 4,240,587 | 12/1980 | Letsch | 241/23 |
| 4,786,003 | 11/1988 | Johnson | 241/101.7 |
| 4,961,539 | 10/1990 | Deem | 241/36 |
| 5,186,397 | 2/1993 | Orlando | 241/23 |
| 5,226,757 | 7/1993 | Tarrant | 406/39 |
| 5,395,061 | 3/1995 | Merklinger | 241/101.7 |
| 5,520,343 | 5/1996 | Aika et al. | 241/99 |

*Primary Examiner*—John M. Husar
*Attorney, Agent, or Firm*—Young & Basile, P.C.

[57] ABSTRACT

A motor truck for use in collecting and processing solid waste material such as scrap tires. The truck includes a chassis including a cab; a body structure positioned on the chassis behind the cab and defining a storage chamber; a shredder mounted on top of the body structure forwardly of the storage chamber; a compactor positioned within the body structure beneath the shredder and forwardly of the storage chamber; and a conveyor system for conveying tires from a curbside location upwardly for discharge downwardly into the open upper end of the shredder. The shredded tires are discharged downwardly into the body structure rearwardly of the compactor, whereafter the compactor is actuated to stroke rearwardly and compress the tire shreds into the storage chamber. After the truck has visited a series of retail tire outlets and the storage chamber is full of tire shreds, the truck returns to a recycling center where a door at the rear of the storage chamber is opened and the compactor is utilized as an ejector to eject the tire shreds from the storage chamber. At the recycling center the tire shreds are processed to form a rubber crumb material and the rubber crumb material is combined with scrap plastic to form a rubber/plastic resin compound in pellet form.

5 Claims, 9 Drawing Sheets

MOBILE TIRE SHREDDER

RELATED APPLICATION

This application is a continuation-in-part of U.S. patent application Ser. No. 398,137 filed on Mar. 3, 1995 now pending.

BACKGROUND OF THE INVENTION

This invention relates to a mobile apparatus for mechanically shearing or shredding solid waste material such as rubber tires.

Disposal of solid waste materials represents a substantial ecological and economic problem. More particularly, scrap automobile tires present an especially vexing ecological and economic problem. Each year there are an estimated 280 million scrap tires discarded throughout North America. Unwanted scrap tire piles scattered throughout the countryside have been estimated to contain as many as 3 billion tires. Scrap tires' poor biodegradability, their tendency to trap gasses and rise to the surface in landfills, the serious fire hazard scrap tires represent, and the breeding environment that unwanted scrap tires offer to disease-carrying pests such as rodents and mosquitos have caused them to be classified as a serious environmental nuisance.

The vast majority of used tires are generated at retail tire outlets where the used tires are removed from vehicles prior to installation of new tires. Traditionally, the tires have been collected from the retail tire outlets by small independent truck operators who merely pick up the old tires, receive a fee for each tire collected, and deposit the old tires at municipal or private dump sites. Specifically, the tires are typically taken from the retailer in a stake truck, are then transferred from the stake truck into a transport trailer, and are then taken in the transport trailer to a tire dump site. This entire collection process, even if efficiently carried out, only exacerbates the existing environmental problem since the supply of festering tires at the dump sites continues to multiply and the availability of dump sites continues to dwindle. Further, the collection process itself is rather inefficient since it is not uncommon for individuals to collect tires from a retail outlet, receive a specified payment for each tire collected, but then never deliver the tires to an authorized dump site. Rather, the tires end up being dumped at the most convenient or closest location where they become an eyesore and further exacerbate the environmental problems associated with tire disposal.

SUMMARY OF THE INVENTION

This invention is directed to the provision of an improved apparatus for collecting refuse material.

More specifically this invention is directed to the provision of an improved motor vehicle for collecting and recycling used tires.

The invention contemplates the provision of a unique motor vehicle capable of being dispatched to retail outlets where waste material is collected on a regular basis, shredded on the site by a shredder carried on the vehicle, stored in shredded form in a storage container provided on the vehicle and then, when the storage container is full, taken by the vehicle to a suitable processing or recycling facility.

According to an important feature of the invention, the motor vehicle includes a cab and a hollow body structure positioned rearwardly of the cab and including a top wall defining an opening providing access to a storage chamber defined by the body structure; the body structure includes a front wall positioned rearwardly of the cab to define a space between the cab and the body structure; and the motor vehicle further includes conveyor means positioned in the space and defining a conveyor path extending from a conveyor loading location proximate the support surface of the vehicle to a conveyor discharge location proximate the opening. This conveyor structure provides an efficient means of transporting tires or other refuse material to the opening in the top wall of the storage chamber, minimizes the lateral profile of the vehicle, and provides maximum utilization of total vehicle volume.

According to a further feature of the invention, the conveyor means includes an endless conveyor assembly including a generally vertical run positioned in the space and a generally horizontal run extending rearwardly from the top of the vertical run to the discharge location. This specific conveyor configuration maximizes space utilization on the vehicle.

According to a further feature of the invention, the motor vehicle is intended for use in handling discrete articles and the conveyor means includes an endless assembly and discrete article engaging members mounted on the endless assembly at spaced intervals. This arrangement allows the conveyor assembly to efficiently handle discrete articles such as used tires.

According to a further feature of the invention, the motor vehicle further includes a shredder positioned on the top wall of the body structure rearwardly of the front wall of the body structure and defining a box structure having an open top and a bottom discharge opening aligned with the opening in the body structure top wall, and the conveyor discharge location is proximate the open top of the shredder box structure. This specific arrangement allows waste material such as tires to be delivered via the conveying means to the shredder for shredding by the shredder and downward discharge of the waste shreds into the storage chamber.

According to a further feature of the invention, the motor vehicle further includes a compactor positioned in the storage chamber and movable rearwardly within the storage chamber to compact the waste shreds.

In the preferred and disclosed embodiment of the invention, the motor vehicle further includes a door closing the open rear end of the body structure and defining the rear end of the storage chamber; power means are provided which are operative to move the compactor within the storage chamber from a forward position generally beneath the shredder to a rearward position proximate the rear end of the body structure; the conveyor assembly includes an endless conveyor assembly including a generally vertical run positioned in the space between the front wall of the body structure and the rear wall of the cab and a generally horizontal run extending rearwardly from the top of the vertical run and over the body structure to a location proximate the shredder input location; and the conveyor assembly further includes a plurality of discrete tire engaging members mounted on the endless conveyor assembly at spaced intervals. With this arrangement successive tires may be loaded onto the conveyor assembly at the conveyor loading location to move the tires successively up the conveyor path for successive discharge into the open top of the shredder, box, successive shredding by the shredder, and successive discharge downwardly into the storage chamber.

DETAILED DESCRIPTION OF THE PREFERRED EMBODIMENT

The invention motor truck, in overview, is designed to travel to a retail tire outlet, pick up a supply of used tires from the outlet, shred the tires on site, store the shredded tires in the truck, thereafter visit further retail tire outlets until the storage capacity of the truck has been exhausted and thereafter return to a recycling center where the shredded tire product is ejected from the truck for use in formulating, for example, a rubber crumb material for recycling applications.

The invention motor truck of the FIGS. 1–10 embodiment, broadly considered, includes a chassis 10, a body assembly 12, a hydraulic system 14, and a control system 16.

Chassis 10 is of known form and includes a cab 18, front wheels 20, rear wheels 22, a platform frame 24, an engine 26 of gasoline or diesel configuration, and a drive train 28 including a transmission 30.

Cab 18 may, as shown, be of the cab-over-engine type and may include a side entry door 32 and a windshield 34. Front wheels 20 are steerable and may, if desired, also be driven.

Rear wheels 22 have a tandem configuration with either the front set of wheels driven by the drive train 28 or both front and rear sets of wheels driven by the drive train.

Platform frame 24 is of standard construction and includes parallel frame rails 32 extending rearwardly from the cab 18 to a position rearwardly of the rear wheels. It will be understood that the front and rear wheels are connected to the cab 18 and the rails 32 by suspension means, not illustrated.

Body assembly 12 includes a body structure 34, a shredder 36, a compactor 38, and a conveyor assembly 40.

Body structure 34 is supported in known manner on chassis rails 32 rearwardly of cab 18 and defines a storage chamber 35. Body structure 34 includes a forward top wall 34a, a rearward top wall 34b joined to the forward top wall 34a by a vertical wall 34c, side walls 34d and 34e, a bottom wall 34f, a front wall 34g, and a rear opening 34h closed by a gate 42 mounted for pivotal movement about a hinge axis 44. Walls 34a, 34b, 34c, 34d, 34e, and 34g have a flat configuration and bottom wall 34f has a downwardly bowed configuration. Gate 42 includes side walls 42a and a bowed main body portion 42b.

Shredder 36 is positioned on body structure top wall 34a and includes a rectangular box or bin 36a defining a bottom discharge opening 36b aligned with an opening 34i in body structure forward top wall 34a. Shredder 36 further includes a hydraulic motor 45 driving parallel shredder shafts 46 through a gear mechanism 47. Each shaft carries a plurality of rotary shearing blades 48 having teeth 48a. The shafts are counter rotated so that the shearing blades 48 are also counter rotated as seen by the arrows in FIG. 4. Box 36a defines an open top 36c so that material may be fed into the box from above for shredding by the counter rotating blades 48. Shredder 36 may take various forms and may, for example, comprise a shredder available from MAC Corporation of Grand Prairie, Tex. as Saturn Shredder Model No. 4428. Shredder 36 also desirably includes a lid 49 mounted on box 36a for movement between the illustrated open position and a closed position closing the open top of the box 36a. The lid is moved between its open and closed positions by a hydraulic cylinder 50 secured to a side face of box 36a.

Compactor 38 is positioned within body structure 34 and has a transverse cross-sectional configuration generally corresponding to the cross-sectional configuration of the body structure. Specifically, compactor 38 includes a flat front wall 38a, a bowed bottom wall 38b corresponding in configuration to the bowed bottom wall 34f of the body structure; a top wall 38c; flat side walls 38d mounted for sliding engagement with body structure side walls 34d, 34e; and a rear surface including a flat lower rear surface 38e and an arcuate upper rear surface 38f extending from the top edge of lower surface 38e in curvilinear fashion to the rear edge of the top wall 38c. Compactor 38 is movable linearly within body structure 34 in stroking fashion by a hydraulic cylinder 48 positioned between the front wall 34g of the body structure and the compactor and having a multiple cylinder telescopic configuration so that the cylinder may expand to many times its stowed configuration so as to enable the cylinder to move the compactor from the extreme forward position seen in solid lines in FIG. 3 to the extreme rearward position, proximate the rear opening 34h of the body structure, seen in dash lines in FIG. 3.

Conveyor assembly 40 is a three-part compound assembly including a chain conveyor 50, a split belt conveyor 52, and a tail conveyor 54.

Chain conveyor 50 includes a pair of rigidly interconnected beam members 56 rotationally supporting a sprocket 58 at their lower ends and a sprocket 60 at their upper ends, and a chain 60 trained around sprockets 58 and 60 and including spaced hooks 62. Beams 56 are pivoted to body structure 34 at 63 and a hydraulic cylinder 64 positioned beneath the body structure includes a piston rod 66 engaging the lower end of beams 56 and operative when actuated to move the chain conveyor 50 from the stored dotted line position of FIG. 4 proximate the side wall 34e of the body structure and an extended operative position, seen in solid lines in FIG. 4, in which the lower end of the chain conveyor has been pivoted outwardly about the pivot axis 62. Chain conveyor 50 is powered by a hydraulic motor 68 driving a shaft 70 which is drivingly connected to the upper sprocket 60.

Split belt conveyor 52 includes a pair of rollers 72 drivingly mounted on shaft 70 on opposite sides of chain conveyor 50, a pair of forward rollers 74 drivingly connected to a drive shaft 76 journalled at its opposite ends in side plates 78, and a pair of belts 80 trained around a respective pair of rollers 72, 74. Motor 68 is secured to the outboard face of one of the side plates 78 so that actuation of the motor upon receipt of a supply of pressurized hydraulic fluid powers chain conveyor 50 via sprocket 60 and powers split belt conveyor 52 via rollers 72.

Tail conveyor 54 includes a roller 82 drivingly secured to shaft 76, a free end roller 84 suitably connected to roller 82 by frame means (not shown) and a belt 86 trained around rollers 82 and 84. Tail conveyor 54 is also driven by hydraulic motor 68, via rollers 72, belts 80, rollers 74, shaft 76, and roller 82. A hydraulic cylinder 88 (shown diagrammatically in phantom in FIG. 4) interconnects the upper end of chain conveyor 50 and an intermediate location on split belt conveyor 52 and a further hydraulic cylinder 90 (also shown diagrammatically in phantom in FIG. 4) interconnects split belt conveyor 52 and tail conveyor 54.

Figure 4:
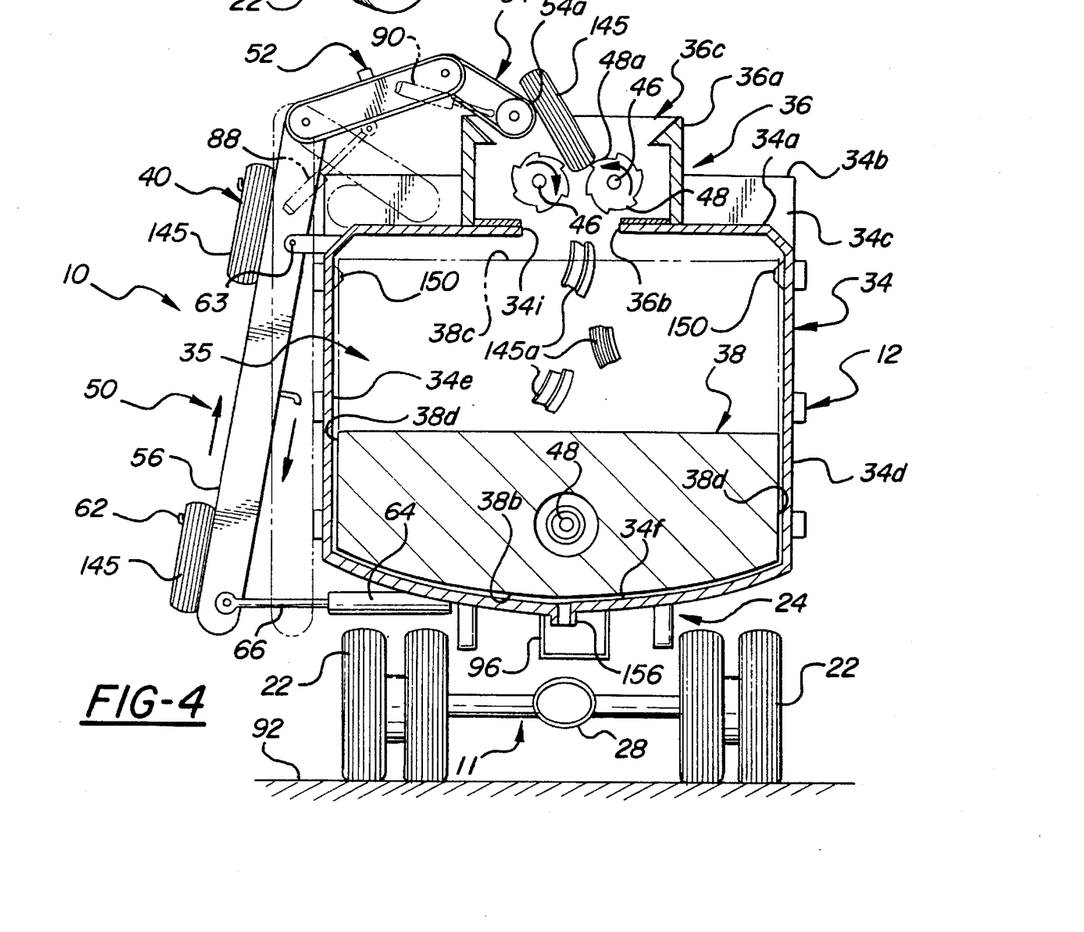
FIG. 4 is a cross-sectional view taken on line 4—4 of FIG. 3.
Figure 5:
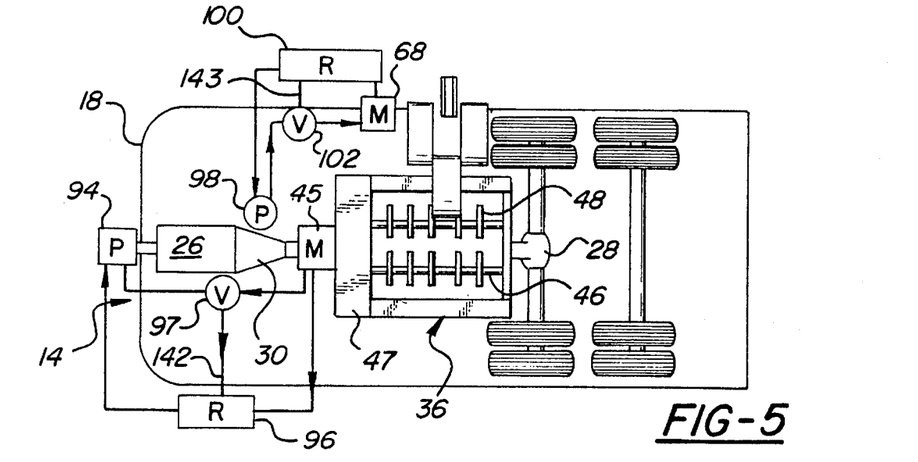
FIG. 5 is a diagrammatic plan view of the invention truck.

Tail conveyor 54 is movable between a dash line stowed position seen in FIG. 4 to the solid line operative position seen in FIG. 4 by actuation of cylinder 64 to move the bottom of the chain conveyor outwardly; actuation of cylinder 88 to pivot twin belt conveyor 52 upwardly about the upper end of the chain conveyor; and actuation of cylinder 90 to pivot the tail conveyor 54 clockwise relative to the outboard end of the split belt 52. The combined action of the cylinders 64, 88, and 90 positions the lower end of the chain conveyor proximate the support surface 92 of the vehicle in spaced relation to the side wall of the vehicle and positions the delivery end 54a of the tail conveyor 54 in overlying relation to the blades 48 of the shredder.

Hydraulic system 14 includes a main pump 94 positioned forwardly of the cab of the vehicle and driven directly from the crank shaft of engine 26; hydraulic motor 45 driving the shredder; a hydraulic reservoir or tank 96 positioned beneath the body structure of the vehicle; and a valve 97.

Hydraulic system 14 further includes a further pump 98 driven by the transmission 30 of the vehicle; the conveyor motor 68; a reservoir or tank 100 positioned beneath the vehicle body structure; and a valve 102.

Figure 8:
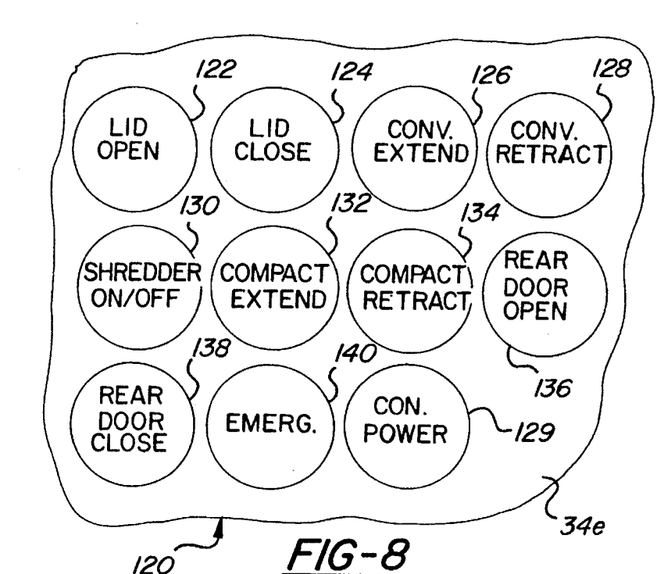
FIG. 8 is a detail view of a control panel provided on the invention motor truck.

Control system 16 includes a control panel 104 positioned on the curb side of the truck forwardly of the conveyor assembly with a plurality of control buttons for controlling the various operations of the invention truck. Specifically, control panel 104 includes a control button 122 controlling the opening of the lid 49; a control button 124 controlling the closing of the lid 49; a control button 126 controlling the extension of the conveyor assembly 50; a control button 128 controlling the retraction of the conveyor assembly 50; a control button 129 controlling power to the conveyor assembly; a control button 130 constituting an ON/OFF switch for the shredder 36; a control button 132 controlling the extension of the compactor 38; a control button 134 controlling the retraction of the compactor 138; a control button 136 operative to open the rear door 42; a control button 138 operative to close the rear door 42; and an emergency system shutoff button 140.

Figure 1:
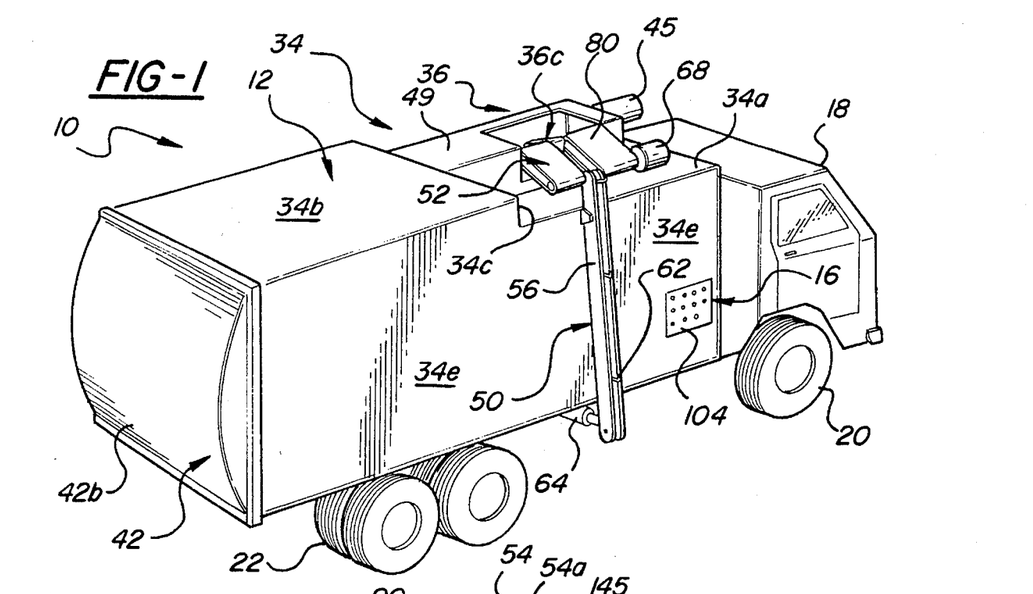
FIG. 1 is a perspective curbside view of a motor truck according to the invention.
Figure 2:
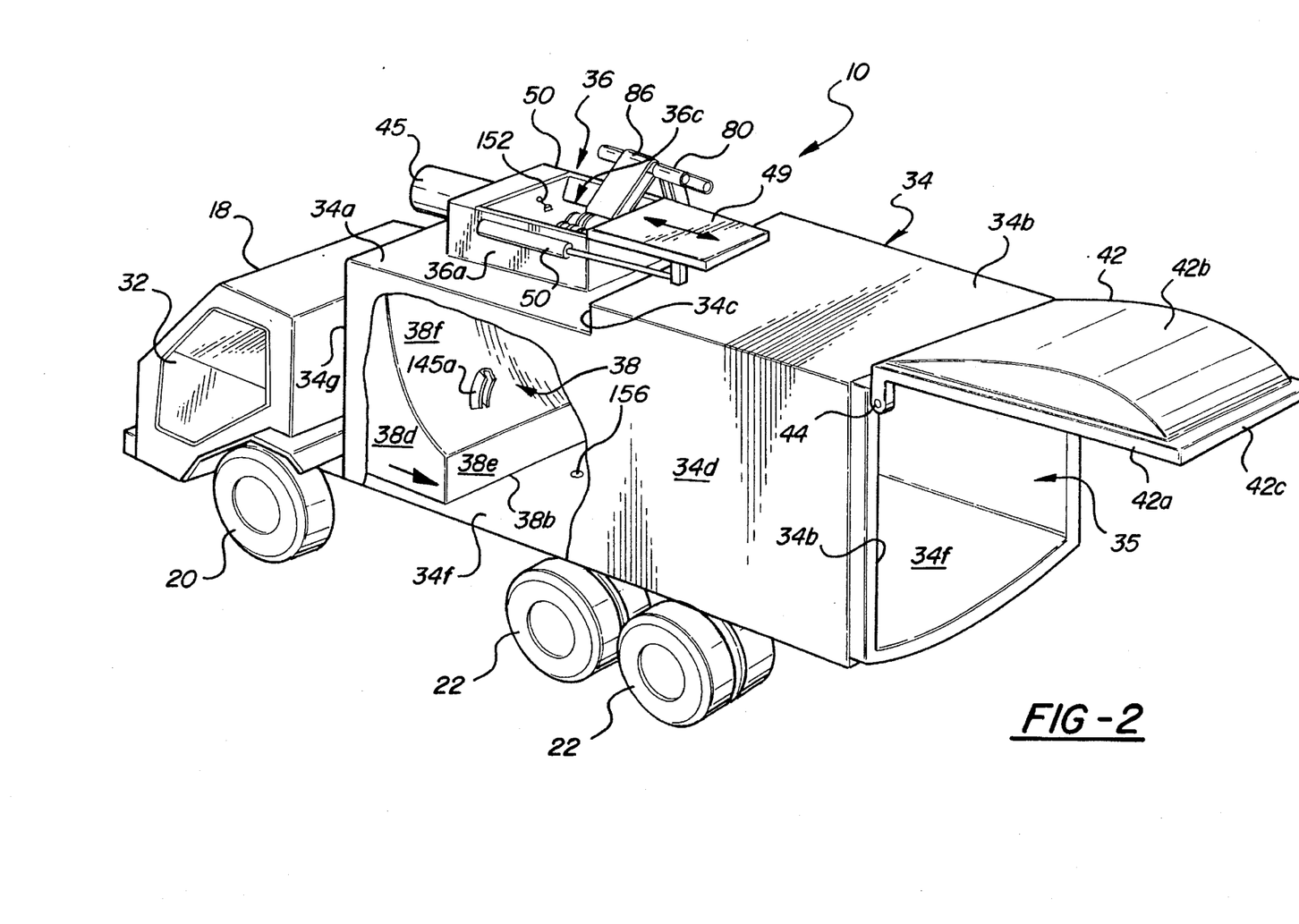
FIG. 2 is a perspective roadside view of the invention motor truck.
Figure 3:
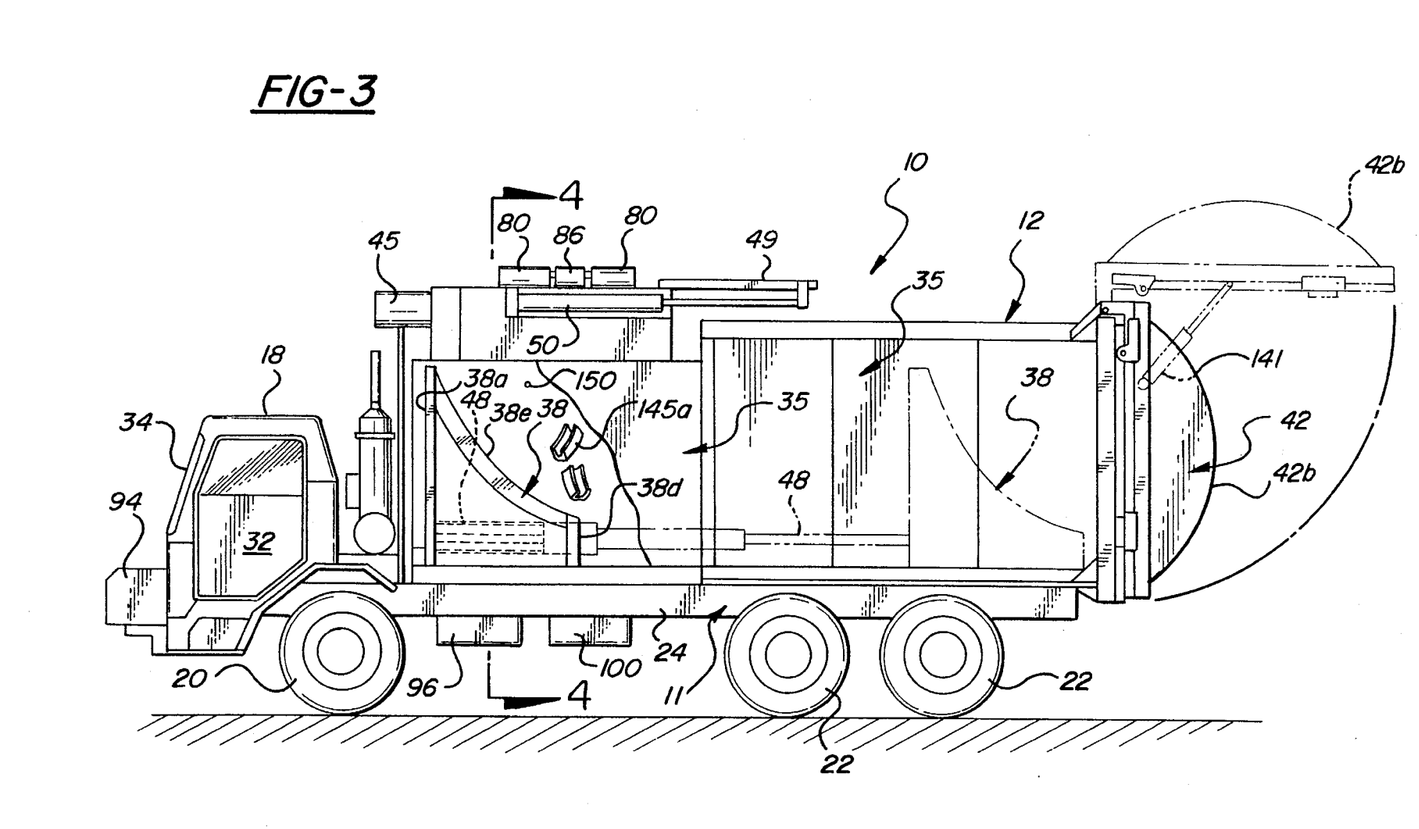
FIG. 3 is a side elevational view of the roadside of the invention motor truck.

Control button 122 is operative when actuated to apply pressurized fluid to hydraulic cylinder 50 in a sense to retract or open the lid 49; control button 124 is operative when actuated to actuate cylinder 50 in a sense to return the lid to a position closing the top of the shredder; control button 126 is operative when actuated to energize cylinders 64, 88, and 90 in a sense to move the conveyor system 50 from the retracted, stored dash line position of FIG. 4 to the solid line extended or operative position of FIG. 4 in which the discharge end 54a of tail conveyor 54 is positioned over the shredder blades 48; control button 128 is operative when actuated to energize cylinders 64, 88, and 90 in a sense to return the conveyor system to its stored dash line position of FIG. 4; control button 129 is operative when actuated to control valve 102 in a sense to deliver pressurized fluid from pump 98 to motor 68 so as to power the conveyor assembly and is operative when again actuated to control valve 102 in a sense to direct pressurized fluid from motor 68 and route the pressurized fluid via a bypass line 143 directly to reservoir 100 so as to shut off power to the conveyor assembly; control button 130 is operative when actuated to control valve 97 in a sense to deliver pressurized fluid from pump 94 to motor 46 so as to power the shredder and is operative when again actuated to control valve 97 in a sense to divert pressurized fluid from motor 46 and route the pressurized fluid via a bypass line 142 directly to the reservoir 96 so as to shut off power to the shredder; control button 132 is operative when actuated to energize cylinder 48 in a sense to extend the cylinder and stroke the compactor rearwardly toward the rear of the body structure; control button 132 is operative when actuated to energize the cylinder 148 in a sense to retract the cylinder and retract the compactor to its solid line position of FIG. 3; control button 136 is operative when actuated to actuate a hydraulic cylinder 141 in a sense move the door 42 to an open position; control button 138 is operative when actuated to energize cylinder 141 in a sense to move the rear door 42 to a closed position; and control button 140 is operative when actuated to shut off all power to the system in the event of a jam or other emergency.

In operation, the truck is driven by the operator to a retail sales outlet for motor vehicle tires where the used tires, accumulated at the retail sales outlet since the last visit of the truck, are collected, shredded, and stored in the storage chamber.

Figure 10:
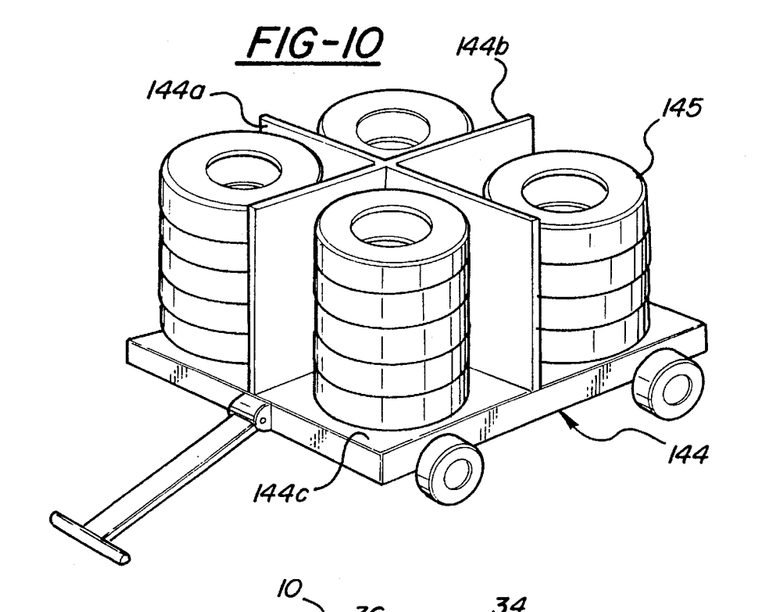
FIG. 10 is a perspective view of a cart utilized in carrying out the invention methodology.
Figure 11:
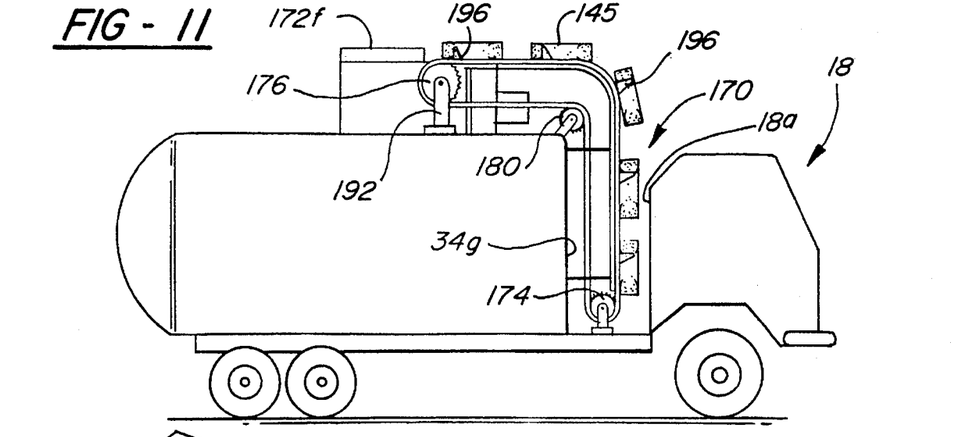
FIG. 11 is a curbside elevational view of a modified motor truck according to the invention.
Figure 12:
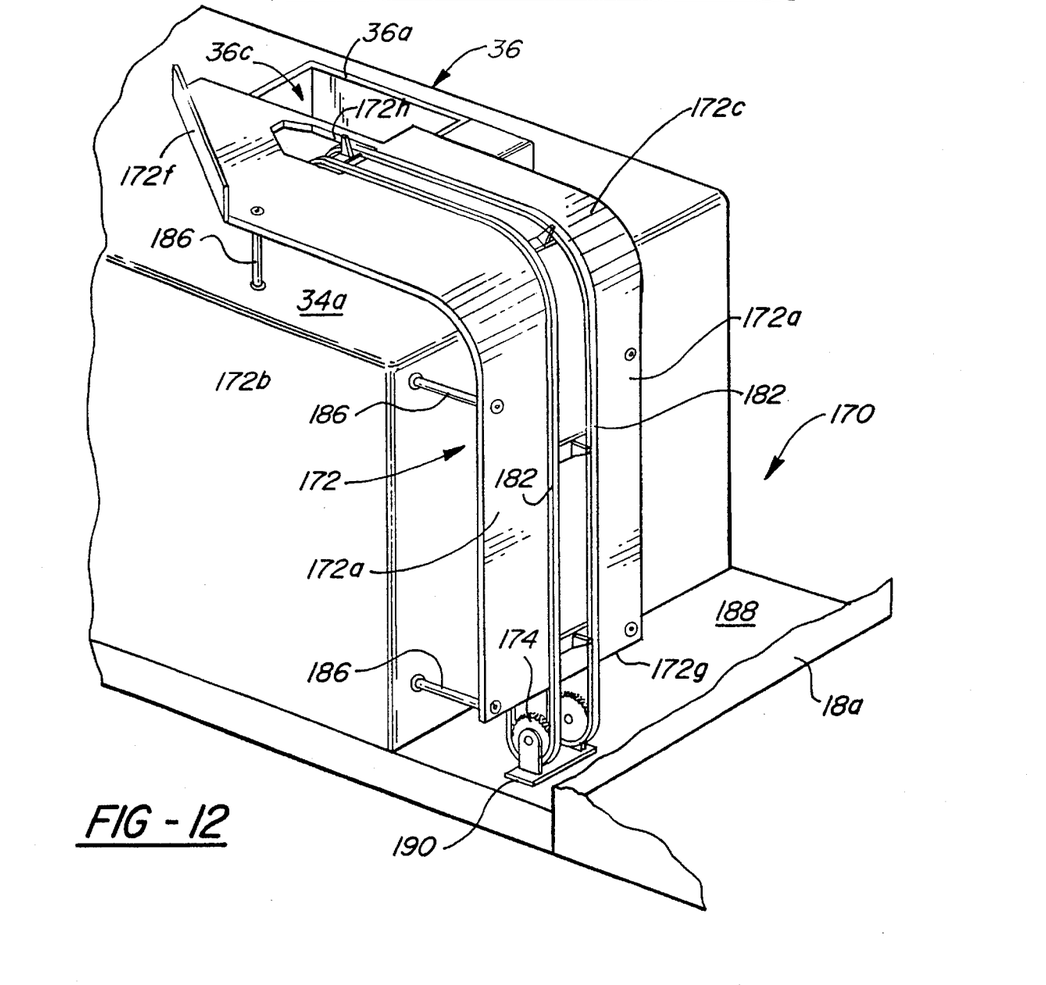
FIGS. 12 and 13 are curbside and roadside fragmentary perspective views, respectively, of the modified truck of FIG. 11.
Figure 13:
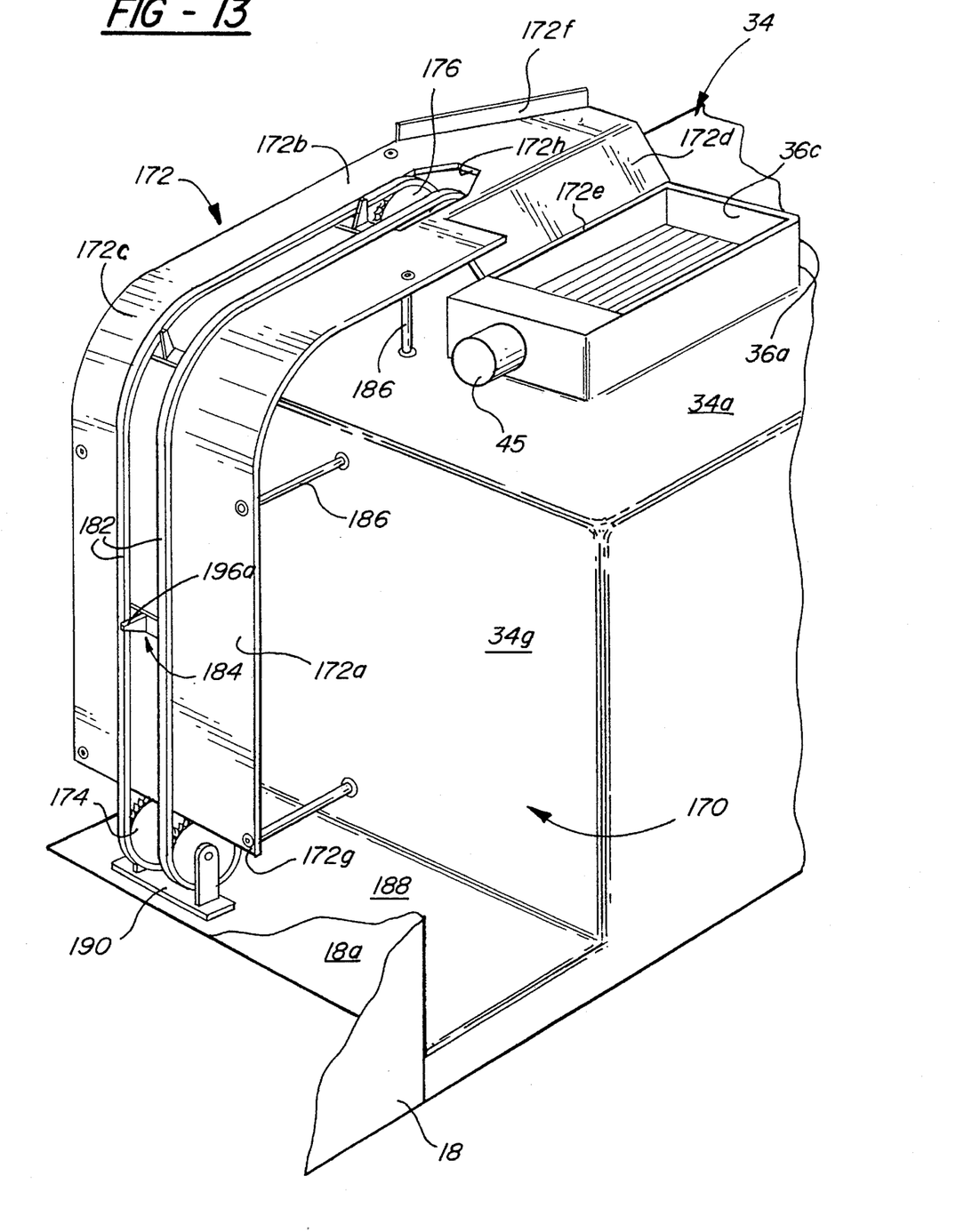
Figure 14:
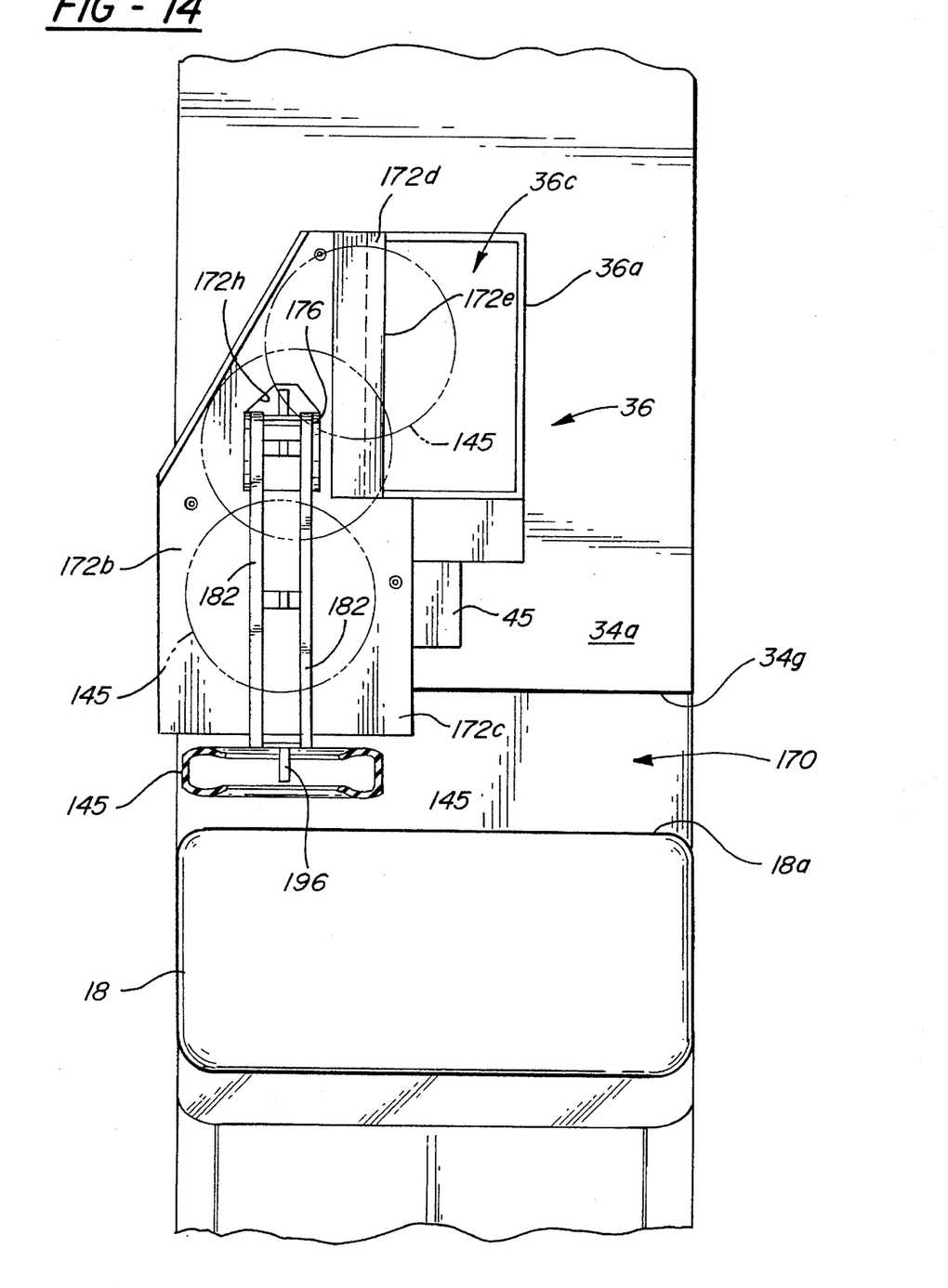
FIG. 14 is a top view of the modified truck of FIG. 11.

A cart 144 may be utilized to facilitate the storage of the used tires 145 at the retail outlet and to facilitate the loading of the tires onto the conveyor system 50. Specifically, cart 144 may comprise a pair of partitions 144a, 144b arranged at right angles to each other and upstanding from the bed 144c of the cart to divide the cart into four areas on each of which a plurality of tires (for example, five) can be stacked.

Figures 6, 7:
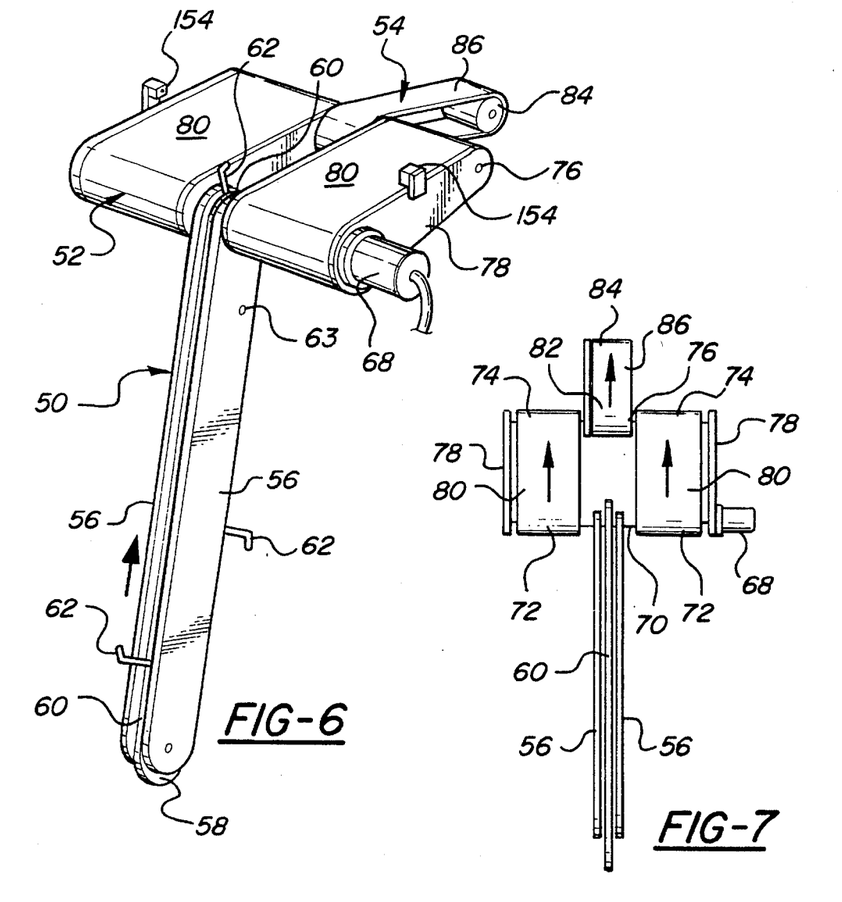
FIGS. 6 and 7 are detail views of a conveyor system utilized in the invention truck.

Upon the arrival of the motor truck at the retail site, the truck is parked with the engine idling so as to continuously drive pumps 94 and 98; the cart 142 is wheeled to a location proximate the conveyor assembly 50; control button 122 is actuated to move the lid 49 to an open position; control button 126 is actuated to move the conveyor assembly 50 to its extended operative position; control button 129 is actuated to deliver pressurized fluid from pump 98 to motor 68 to power the conveyor assembly; control button 130 is actuated to deliver pressurized fluid from pump 94 to motor 45 to power the shredder; the vehicle operator places a tire 145 on each hook 62 as the chain conveyor 56 moves in the direction of the arrows in FIGS. 4 and 6; the tires 145 are carried upwardly by chain conveyor 56, picked up by split belt conveyor 52 for delivery to tail conveyor 54, and discharged by tail conveyor 54 into the open top 36c of the shredder box 36a; and the tires falling downwardly into the open top of the shredder box 36a pass between the counter rotating shredder blades 48 where they are shredded by shredder blade teeth 48a to produce a plurality of tire shreds or fragments 145a which pass through aligned openings 36b and 34a for downward discharge into the storage chamber 35 defined by body structure 34 at a location above and immediately rearwardly of compactor 38.

After all of the tires 145 at the retail sales outlet have been loaded onto the conveyor system and shredded by the shredder, control button 130 is again actuated to divert pressurized fluid from hydraulic motor 45 and turn off the shredder whereafter control button 132 is actuated to energize hydraulic cylinder 48 in a sense to extend the compactor 38 and move the tire shreds 144a rearwardly within storage chamber 35; control button 134 is actuated to energize the hydraulic cylinder 48 in a sense to retract the compactor and return the compactor to its solid line position seen in FIG. 3; control button 124 is actuated to move the lid 49 to its closed position; control button 129 is actuated to shut off power to the conveyor assembly; and control button 128 is actuated to return the conveyor assembly to its stored position.

The truck is now ready to be driven to another retail tire sales outlet where more tires 145 will be shredded and moved into the storage chamber. This process is continued until the storage chamber has been filled with tire shreds, whereafter the truck will return to a recycling or processing facility where the shredded contents of the truck are discharged. Specifically, upon arrival at the processing or recycling facility, control button 136 is actuated to open the rear door; control button 132 is actuated to extend the compactor and move the compactor from the solid line position of FIG. 3 to the dash line position of FIG. 3 and discharge all of the shredded tire contents from the vehicle onto a suitable surface or into a suitable container; control button 134 is actuated to return the compactor to its solid line position of FIG. 3; and control button 138 is actuated to return the rear door 42 to its closed position.

The truck is now ready to resume the task of picking up used tires at a prescheduled series of retail tire outlets until the storage chamber has again been filled with tire shreds whereafter the truck will again return to the processing or recycling center to discharge its shredded contents.

It will be understood that the extent to which compactor 38 is moved rearwardly upon actuation of control button 132 will depend upon the amount of tire shreds already in the storage chamber. Specifically, the hydraulic system supplying pressurized hydraulic fluid to cylinder 48 includes a pressure sensor which shuts off the delivery of pressurized fluid to the cylinder 48 after a predetermined hydraulic fluid pressure is sensed corresponding to a predetermined resistance being encountered by the rearwardly moving compactor. It will further be understood that the rearward stroke or movement of the compactor will be less and less as the storage chamber becomes more and more filled with tire shreds until a situation is reached in which literally no rearward movement of the compactor is possible because of the stored tire shreds. As a further precaution to guard against overloading the storage chamber and overstressing the compactor, a photoelectric eye 150 is provided in the body structure immediately beneath the discharge opening of the shredder. When the beam of the photoelectric eye 150 senses that the tire shreds have reached a level corresponding to the level of the beam, the beam disables the shredder and the compactor so as to preclude the delivery of further tire shreds to the storage chamber with consequent overloading of the compactor. The concave, curvilinear rearward surface 38e of the compactor has the effect of moving tire shreds rearwardly and simultaneously upwardly as the compactor moves rearwardly so as to ensure that the entire storage chamber 35 is filled with tire shreds.

Shredder 36 also desirably further includes a spray nozzle 152 positioned to discharge water downwardly into the area between the counter rotating blades 48 as the blades are rotating to shred tires 145. The water from nozzle 152 has the effect of cooling and lubricating the tire shreds 145a. It will be understood that a water tank and water pump (not shown) will also be provided to provide a supply of pressurized water to the nozzle 152.

The truck further includes a further photoelectric eye 154 positioned on the conveyor assembly and operative to count each tire as the tire is loaded onto the truck. For example, and as best seen in FIG. 6, a photoelectric eye 154 may be provided on split belt conveyor 52 where it senses the passage of each tire 145 between the elements of the photoelectric eye. The passage of each tire is arranged to be digitally read out on a suitable instrument in the cab 18 of the truck and a record of each tire loaded onto the truck is entered into a suitable memory device positioned in the cab of the truck. The truck further desirably includes a mobile fax which enables the operator to fax a bill of lading at the end of each pickup to the processing or recycling center where the information on the fax is recorded for each pickup made by the truck so that, when the truck eventually arrives at the processing or recycling center with a full load of shredded tires, the center is already aware of the number of tires on the truck and the pounds of rubber on the truck generated by the shredded tires. To ensure against theft on the part of the driver, the truck desirably is weighed in as it arrives at the processing or recycling center to ensure that all of the tires that have been loaded onto the truck are accounted for. The truck also desirably includes a mobile telephone to facilitate communication between the driver and the processing center so that the operator may follow either a preselected route of retail sales outlets or may receive directions for a new retail sales outlet after each pick up.

Preferably the shredder also includes an overload sensing device which, in the event of jamming of the shredder due to an overload condition or due to the inadvertent loading of foreign objects into the shredder, shuts down the shredder, and also shuts down the conveyor assembly to preclude the delivery of more tires to the shredder until such time as the shredder has been cleared.

The floor 34f of the body structure preferably has a slight slope downwardly toward the front of the body structure so that water from the spray nozzle 152, as well as stagnant water collected in the tires, collects on the floor toward the front end of the body structure where it may be conveniently discharged, for example into a sewage drain, through a discharge drain opening 156.

Figure 9:
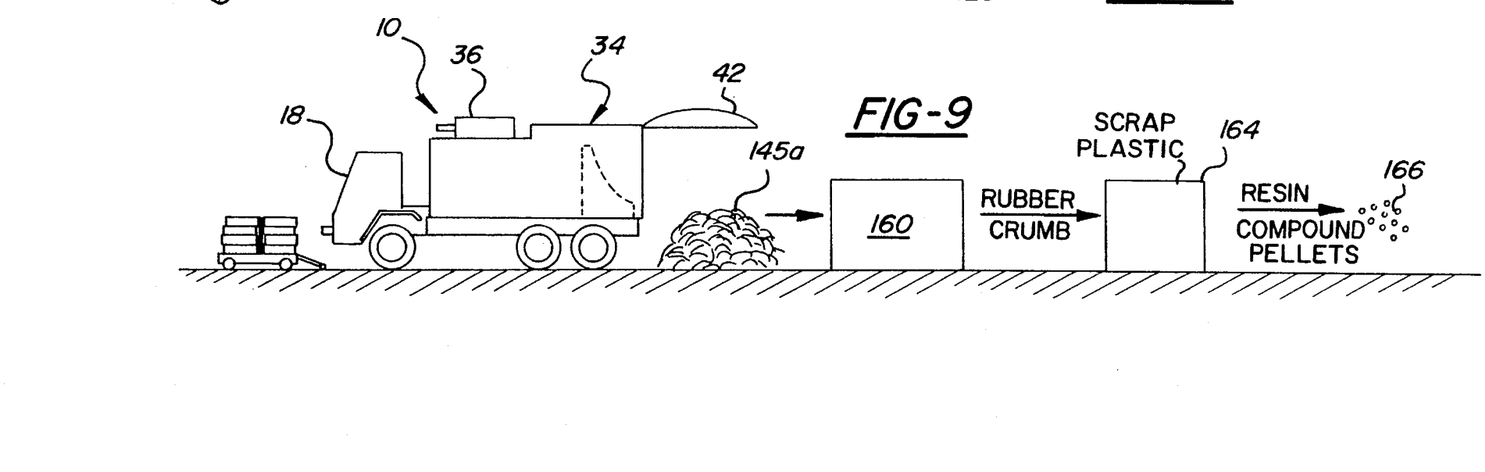
FIG. 9 is a schematic view illustrating an invention methodology.

Upon arrival of the truck at the recycling center, the tire shreds 145a are discharged from the truck and delivered to a processor 160 where the tire shreds are reduced to a rubber crumb material 162. This rubber crumb material 162 is in turn fed to a further processing apparatus 164 where the rubber crumb is mixed with recycled plastic material to form a resin compound of rubber and plastic in the form of pellets 166. The rubber/plastic resin compound pellets 166 provide a feed stock that has many applications in the production of commercial products. For example, the pellets 166 may be used in the formation of asphalt pavement mixtures, in the formation of asphalt emulsion/sealants, or in the formation of asphalt roofing products.

The modified motor truck of the FIGS. 11–16 embodiment is generally similar to the motor truck of the FIGS. 1–10 embodiment except that the conveyor assembly for moving the used tires from a position proximate the support surface for the vehicle to the shredder is positioned essentially in a space 170 provided between the forward wall 34g of the body structure and the rear wall 18a of cab 18.

The conveyor assembly of the FIGS. 11–16 embodiment includes a guide plate 172; lower drive sprockets 174; upper drive sprockets 176; idler sprockets 180; chains 182; and hook assemblies 184.

Guide plate 172 is formed of a suitable sheet metal and includes a vertical portion 172a positioned rigidly in space 170 by, for example, struts 186 fastened to body structure front wall 34g; a horizontal portion 172b supported by struts 186 in a position in overlying relation to the top wall 34a of the body structure and generally to the curbside of the shredder box 36a; and a curvilinear intermediate portion 172c interconnecting the upper end of vertical portion 172a and the forward end of horizontal portion 172b and coacting with the portions 172a, 172b to define a smooth continuous guide surface extending from a loading location proximate the floor 188 of the space 170 to a discharge location proximate the open top 36c of the shredder box. Guide plate 172 further includes a chute portion 172d at the rearward end of horizontal portion 172b angled downwardly to dispose its lower edge 172e proximate the curbside edge of shredder box opening 36c. Guide plate 172 further defines an angled deflective portion 172f proximate the rearward end of the guide plate and generally laterally opposite chute portion 172d.

Lower drive sprockets 174 are supported in laterally spaced relation on the floor 188 of space 170 as, for example, by a bracket 190 fixedly secured to the floor 188. Sprockets 174 are positioned proximate the lower edge 172g of the guide plate with their forward peripheries in general alignment with the forward face of the guide plate.

Upper drive sprockets 176 are fixedly positioned in laterally spaced relation on the top wall 34a of the body structure 34 as, for example, by a bracket 192 upstanding from the top wall. Sprockets 176 are positioned beneath the rearward end of horizontal guide plate portion 172 generally laterally opposite chute portion 172d.

Chains 182 have a standard link chain construction and are trained in laterally spaced relation over respective lower drive sprockets 174, respective upper drive sprockets 176, and respective idler sprockets 180. Between lower drive sprockets 174 and upper drive sprockets 176, the chains slide over and are supported by the vertical portion 172a of the guide plate, thereafter the curvilinear intermediate portion 172c of the guide plate, and thereafter the horizontal portion 172b of the guide plate. As the chains pass over the sprockets 176, they angle downwardly through an opening 172h in the guide plate for passage over the upper drive sprockets 176. The surface of guide plate 172 over which chains 182 slide may be provided with an appropriate lubricant coating such as Teflon™.

Figure 15:
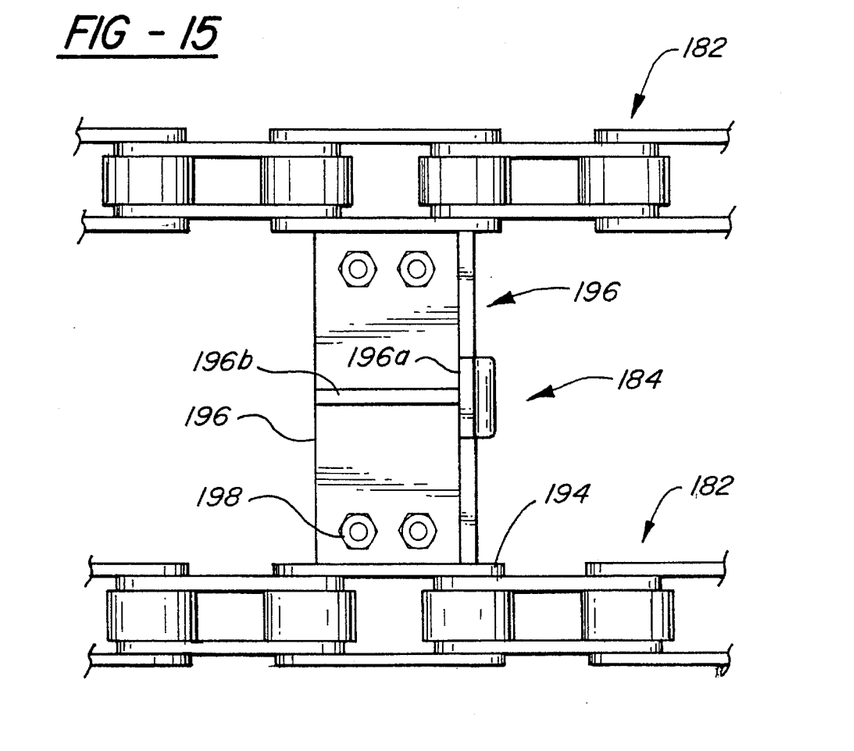
FIGS. 15 and 16 are detail views of a conveyor structure utilized in the modified truck of FIG. 11.
Figure 16:
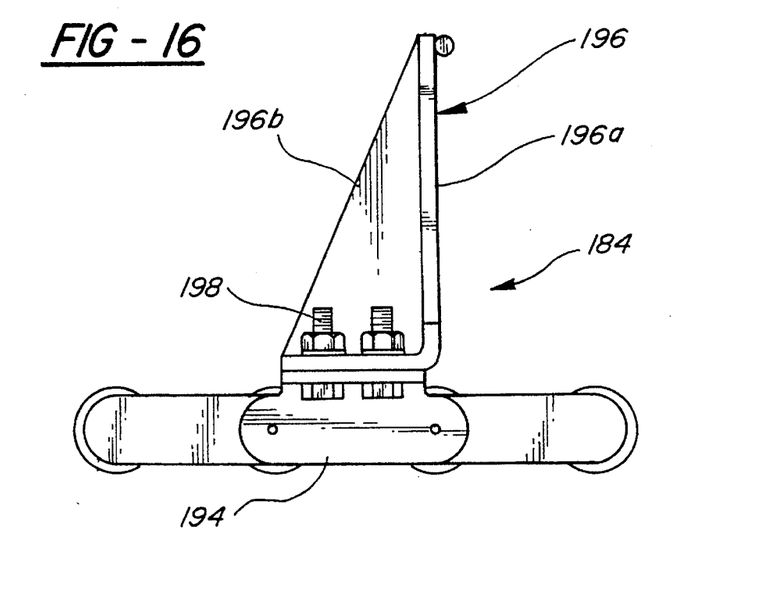

Each hook assembly 184, as best seen in FIGS. 15 and 16, includes a support bracket 194 and a hook member 196. Each support bracket 194 spans and is secured to the spaced chains 182 at a location along the chains spaced from the previous and next successive hook assembly. Each hook member 196 is fixedly secured to a respective support bracket 194 as by bolts 198 and includes an upstanding finger portion 196a reinforced by a gusset portion 196b.

Guide plate 172 has a width slightly exceeding the width of a standard tire, chute portion 172d has a length slightly exceeding the diameter of a tire, and hook assemblies 184 are spaced along chains 182 by a distance sufficient to enable tires to be individually loaded onto the conveyor assembly without interference with the previous or next successive tire. Either or both of lower drive sprockets 174 and upper drive sprockets 176 may be driven by motor means (not shown) so as to cause the chains and hook assemblies to move along a conveyor path extending from the conveyor loading location proximate the floor 188 of the space 170 to a conveyor discharge location proximate the opening 36c of the shredder box.

In use of the conveyor assembly of the FIGS. 11–16 embodiment, the conveyor assembly is put into motion by a suitable control means (incorporated for example in control panel 104) and used tires 145 are individually loaded onto the conveyor. A casing of a tire 145 is positioned on the finger portion 196a of each hook assembly 184 so that the tires pass upwardly on vertical guide plate portion 172a within the space 170 defined between the rear wall of the cab and the front wall of the body structure, move in curvilinear fashion along the curvilinear intermediate guide plate portion 172c, move along the forward section of the horizontal guide plate portion 172b, and thereafter encounter the deflector 172f which gradually urges the tires laterally inwardly toward the chute 172d, whereafter the tires slide downwardly along the chute 172d and into the open top 36c of the shredder box for shredding and downward discharge into the storage chamber. As the tires begin to engage the deflector portion 172f and begin their lateral movement toward and down the chute 172d, chains 182 move downwardly around sprockets 176 to disengage the tires and allow the tires to fall freely down the chute 172d. The operation of the motor vehicle is otherwise as described with respect to the FIGS. 1–10 embodiment.

Although the invention motor truck has been described in association with processing rubber motor vehicle tires, the invention motor truck has usefulness wherever it is desired to process any type of solid waste material. For example, the invention motor truck may be utilized to process plastic waste in the form of plastic bottles. In this application, the conveyor assembly 50 would be modified to specifically handle pickup and delivery of plastic bottles to the shredder 36. The handling of plastic bottles might be accomplished by the provision of a separate conveyor system on the roadside of the truck, opposite the conveyor system for picking up tires, which would operate to deliver plastic bottles to the shredder. Whereas the same motor truck might have a curbside conveyor system for handling rubber tires and a roadside conveyor system for handling plastic bottles, more typically the motor truck would have one conveyor system or the other.

The invention motor truck will be seen to have many important advantages. Specifically, the motor truck provides a viable alternative to the present system of disposing of rubber tires where the tires are typically collected from the retail sales sites and hauled to dump sites where they create an eyesore, a fire hazard, and an environmentally offensive condition. The present invention allows the scrap tires to be efficiently collected and taken to a recycling center where they are reduced to rubber crumb which may be further combined with scrap plastic to form a resin/plastic compound. The invention motor truck, and the invention methodology, thereby serve to simultaneously eliminate an environmental problem and simultaneously produce a commercially usable product.

Yet more specifically, the invention motor truck, by allowing the shredding of the scrap tires at each retail site, allows a given vehicle to collect a far greater amount of scrap rubber than is possible utilizing conventional trucks, thereby adding considerably to the efficiency of the collection process. The invention motor truck and methodology further provide a convenient and efficient means of collecting and processing any type of solid waste material.

Whereas a preferred embodiments of the invention have been illustrated and described in detail, it will be apparent that various changes may be made in the disclosed embodiments without departing from the scope or spirit of the invention.

We claim:

1. A motor vehicle comprising:

a cab;

a hollow body structure positioned rearwardly of the cab, defining a storage chamber, and including a top wall and a front wall positioned rearwardly of the cab to define a space therebetween;

a shredder mounted on the body structure in overlying relation to the storage chamber and including a bottom discharge discharging downwardly into the storage chamber and a shredder box having an open top;

a door closing the open rear end of the body structure and defining the rear end of the storage chamber;

a compactor positioned in the storage chamber and movable rearwardly within the storage chamber;

power means operative to move the compactor within the storage chamber from a forward position to a rearward position proximate the rear end of the body structure; and conveyor means positioned in the space and defining a conveyor path including a vertical conveyor path portion extending upwardly within the space from a lower conveyor loading location proximate the support surface for the vehicle to an upper location proximate the top wall of the body structure and a horizontal path portion extending rearwardly in overlying relation to the top wall of the body structure from the upper location of the vertical path portion to a conveyor discharge location proximate the open top of the shredder box.

2. A motor vehicle according to claim 1 wherein:

the motor vehicle comprises a mobile tire shredding apparatus;

the conveyor means includes an endless conveyor member including a generally vertical run positioned in the space and constituting the vertical conveyor path portion and a generally horizontal run extending rearwardly from the top of the vertical run and over the body structure to the conveyor discharge location and constituting the horizontal conveyor path portion; and the conveyor means further includes a plurality of discrete tire engaging members mounted on the endless conveyor member at spaced intervals so that successive tires may be loaded onto the conveyor member at the conveyor loading location to move the tires successively up the conveyor path in the space and thereafter rearwardly over the top wall of the body structure for successive discharge into the open top of the shredder box, successive shredding by the shredder, and successive discharge downwardly into the storage chamber.

3. A motor vehicle according to claim 2 wherein:

the conveyor means further includes a guide plate having a vertical portion positioned in the space, a horizontal portion extending over the body structure to a location proximate the open top of the shredder box, and a curvilinear portion interconnecting the vertical and horizontal portions; and the endless conveyor member moves slidably over the guide plate.

4. A motor vehicle according to claim 1 wherein the conveyor means includes:

a horizontal guide plate extending over the body structure from the space to a location proximate the shredder box and defining the horizontal path portion;

means for moving articles rearwardly along the top surface of the guide plate to a location proximate one side edge of the shredder box; and means for moving the articles laterally from the side edge of the shredder box into the open top of the shredder box.

5. A motor vehicle according to claim 4 wherein:

the means for moving the articles laterally comprises a chute angled laterally downwardly from the guide plate to a location proximate the open top of the shredder box and deflector means engaging articles moving rearwardly along the guide plate and operative to move the engaged articles laterally down the chute and into the shredder box.

* * * * *